(12) United States Patent
Vilasagar et al.

(10) Patent No.: US 6,784,253 B2
(45) Date of Patent: Aug. 31, 2004

(54) ENHANCED POLYMERIZATION PROCESS

(75) Inventors: Shripathy Vilasagar, Parkersburg, WV (US); Vern Lowry, Ottawa, IL (US); Dane M. Ferraris, Parkersburg, WV (US); Ke Feng, Vienna, WV (US); Robert E. Colborn, Niskayuna, NY (US); Matthew Hal Littlejohn, Green Island, NY (US); David Francis Townsend, Loganville, GA (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/200,877

(22) Filed: Jul. 23, 2002

(65) Prior Publication Data

US 2004/0059079 A1 Mar. 25, 2004

Related U.S. Application Data (60) Provisional application No. 60/307,445, filed on Jul. 24, 2001.

(51) Int. Cl.⁷ ............................................... C08L 51/04
(52) U.S. Cl. .................... 525/316; 525/86; 525/314; 525/263
(58) Field of Search ........................ 525/316, 86, 314, 525/263

(56) References Cited

U.S. PATENT DOCUMENTS

| | | |
|---|---|---|
| 2,430,562 A | 11/1947 | Fryling |
| 3,991,136 A | 11/1976 | Dalton et al. |
| 4,003,871 A | 1/1977 | Costanza |
| 4,145,494 A | 3/1979 | Neubert |
| 4,272,425 A | 6/1981 | Miller et al. |
| 4,301,264 A | 11/1981 | Moore et al. |
| 4,822,858 A | 4/1989 | Pivotto et al. |
| 5,569,709 A * | 10/1996 | Sue et al. ................. 525/52 |

FOREIGN PATENT DOCUMENTS

| DE | 3327190 | 7/1983 |
|---|---|---|
| EP | 0761693 A | 3/1997 |

* cited by examiner

*Primary Examiner*—James J. Seidleck
*Assistant Examiner*—Olga Asinovsky (57) ABSTRACT

An emulsion polymerization process for the preparation of polybutadiene grafted with styrene and acrylonitrile monomers in a reaction system is provided. The resultant product has a low end content of unreacted residual monomers, low yellowness index, and improved impact strength. The diene rubber is prepared via a process wherein a chain transfer agent is added on a continuous basis to give a rubber substrate having a low crosslink density. In one embodiment of the invention, the process includes charging the reaction system with a pre-selected diene emulsion with a low crosslink density, adding a first portion of at least one of a styrene monomer and acrylonitrile monomer to the diene emulsion, adding to the reaction system, over a predetermined time, an initiator and a second portion of acrylonitrile and styrene monomer, and polymerizing the catalyzed reaction mixture of diene substrate, styrene and acrylonitrile to form ABS graft polymers. In another embodiment, a third monomer is added after the conversion rate of the monomers is greater than 98%.

18 Claims, 5 Drawing Sheets

ENHANCED POLYMERIZATION PROCESS

THIS APPLICATION CLAIMS RIGHTS OF PRIORITY FORM U.S. PROVISIONAL PATENT APPLICATION SERIAL No. 60/307,445, ALL FILED JUL. 24, 2001, WHICH ARE HEREBY INCORPORATED BY REFERENCE.

This invention relates generally to a process for preparing polymers having a low residual monomer content while retaining material properties such as flow, impact and color.

BACKGROUND OF THE INVENTION

In a two-step embodiment to manufacture ABS in a typical emulsion process, a rubber latex is made in the first step. EPA 762693 discloses the first step of the emulsion process, a semi-batch process for the manufacture of diene rubber latex wherein a chain transfer agent such as t-ddm, is added upfront in the beginning of the reaction with the butadiene monomer and initiator. In order to get a sufficient low crosslink density in the rubber latex, high levels of chain transfer agents must be added with associated raw material costs and problems with reactor fouling as well as residual odor in final ABS products from the chain transfer agents.

In the second step of an emulsion process, acrylonitrile and styrene may be emulsion polymerized with the diene rubber latex to form an acrylonitrile-butadiene-styrene (ABS) graft polymer. The polymerization reaction is typically run to completion. However, sometimes even when the polymerization is substantially complete, undesired amounts of acrylonitrile monomer and/or styrene monomer dissolved or occluded in the polymer and in the reaction system water can still remain. The normal unit operations of stripping by vacuum or steam stripping the reaction system content do not remove all of this undesirable residual acrylonitrile and/or styrene monomer.

The importance of monomer conversion in ABS material has been recognized since its inception as a commercial material. The acute toxicity of acrylonitrile is well known and both butadiene and styrene monomers have been associated with health issues. From a manufacturing perspective, the full utilization of the monomers provides both for higher productivity and lower costs associated with recovery, recycle or disposal of the residual monomers. Also, manufacturers must abide by regulations that apply to their plant which place limits on allowable volatile material releases. In the marketplace, there is an increasing desire to deliver ABS material (e.g., pellets) with low levels of volatile materials.

There are several processes which are employed to achieve low residual monomer levels in the ABS product. In many cases, this is done by drying in ovens or fluid beds after the polymerized material is isolated. This 'end-of-pipe' approach allows for excellent reduction of the residual monomers, but at the expense of both investment capital and operating costs to achieve the desired reduction. A potentially more effective approach entails the more complete conversion of the monomers during the polymerization reaction. Even within this avenue, several different methodologies have been used.

The use of additional monomers to aid in conversion has been employed both during the main reaction and at the end of the grafting reaction. For example, vinyl carboxylates have been used during the course of the reaction. Other patents describe the use of additional monomers at the end of the reaction including butadiene (U.S. Pat. No. 4,272, 425), acrylonitrile (U.S. Pat. No. 4,822,858), n-vinyl mercaptans (German Patent No. DE 3,327,190), and methyl methacrylate (MMA) (U.S. Pat. No. 3,991,136—after polymerizing at least about 90% of monomer formulation). Most of the work with additional monomers do include some additional initiators also. U.S. Pat. No. 4,301,264 describes the use of a secondary initiator late in the reaction.

The problem with existing approaches has been that either the residual monomer levels are still higher than desirable or that a concomitant loss in other physical properties (e.g., color or impact strength) makes the resultant material unattractive as a commercial product.

As noted above, it is highly desired to lower emission of volatile hazardous organic components. As the conversion to ABS graft polymer is increased in such a polymerization to reduce residual monomers (which ultimately end up as hazardous volatile organic compounds) at the end of a graft polymerization, the rubber crosslink density of the graft polymer is also increased which adversely affects the impact, especially at low (sub zero) Fahrenheit temperatures.

In order to improve the low temperature impact, typically in the past either the graft molecular weight is increased and/or a higher molecular weight matrix styrene acrylonitrile (SAN) is used. However, either of these two approaches raise the melt viscosity of the blend, thus adversely affecting the flow and processability of the blend. Another approach used is to increase rubber level in the product formulation, which also reduces flow and reduce modulus.

BRIEF SUMMARY OF THE INVENTION

In one embodiment of the invention, a semi-batch process for preparing low crosslink density diene rubber substrate is provided. The process includes adding an initial liquid batch to a reaction system, said liquid batch includes water, an emulsifier, and a diene monomer. The process further includes adding a liquid feed composition including butadiene, an initiator and a chain transfer agent to the reactor system, at or after the conclusion of the addition of the liquid batch to the reaction system. The continuous addition of the chain transfer agent allows for the preparation of a low density cross linked diene rubber substrate.

In another embodiment, a method of optimizing the flow and low temperature impact of ABS graft polymers is provided, which includes associating the rubber crosslink density of diene substrate used to make ABS graft polymer with the room temperature and low temperature impact strength of the ABS graft polymer made therefrom, and selecting the appropriate crosslink density diene substrate associated with the desired flow and low temperature impact of the ABS graft polymer.

In a third embodiment, a method of maintaining the flow-impact balance in an ABS graft polymer product while achieving higher conversion and reduced monomer emissions is provided. The method includes offsetting a crosslink density (% A) increase in the ABS graft polymer (due to increased conversion) by selecting a diene substrate of lower crosslink density (% A) to prepare the ABS graft polymer product.

In yet another embodiment of the present invention, an emulsion polymerization process for the preparation of polybutadiene grafted with styrene and acrylonitrile monomers in a reaction system is provided. The resultant product has a low end content of unreacted residual monomers. The process includes: a) charging the reaction system with a diene emulsion; b) adding to the reaction system, over a predetermined time, an optional initiator, acrylonitrile and styrene monomers; c) polymerizing the catalyzed reaction mixture of polybutadiene, styrene and acrylonitrile; and d) adding a third monomer and an optional initiator to the reaction mixture after the conversion rate of the monomers is about 98% or higher.

In another embodiment, an emulsion polymerization process for the preparation of ABS graft polymer having a low yellowness index is provided. The process includes maintaining an appropriate ratio of unreacted styrene to acrylonitrile monomers in the reaction system.

DETAILED DESCRIPTION OF THE INVENTION

ABS polymers can be produced via emulsion or mass (bulk) polymerization processes. The emulsion polymerization process is a two-step process, with the first step to prepare a rubber latex, and the second step for the polymerization of styrene and acrylonitrile in the rubber latex solution to form an ABS latex. The ABS polymer is recovered through coagulation of the ABS latex by adding a stabilizing agent. The slurry is filtered or centrifuged to recover the ABS resin.

Production of low-crosslink density rubber latex via continuous addition of chain transfer agent. In one embodiment of an emulsion polymerization process of the present invention, a low-crosslink density rubber latex is achieved. Applicants have surprisingly found that the continuous addition of the chain transfer agent during the feed portion of the semi-batch process to make rubber latex allows for the production of low crosslink density rubber latex, as compared to batch charging the chain transfer agent (adding all the chain transfer agent at the beginning of the reaction) in the prior art process.

In one embodiment of the invention, the rubber latex is a diene rubber latex. Suitable diene monomer feed includes butadiene and isoprene and various comonomers, which may be present to produce copolymers of butadiene with up to 50 percent by weight of comonomers such as styrene, acrylonitrile, methylmethacrylate or $C_1$–$C_6$-alkylacrylate. In another embodiment, up to 35 percent by weight of comonomers is added.

Comonomers can be present in the rubber at a level of less than 50 percent by weight, preferably less than 40 weight percent and most preferably less than about 25 weight percent based on the total weight of the monomers. Most preferably no comonomer is used due generally to the tendency of comonomer to reduce the efficiency of the reflux cooling. Suitable comonomers include vinyl aromatic monomers and vinyl cyanide (unsaturated nitrile) monomers.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the Monovinylidene aromatic monomer i.e. vinyl toluene, vinylxylene, butylstyrene, para-hydroxystyrene or meth-oxystyrene or mixtures thereof. The monovinylidene aromatic monomers utilized are generically described by the following formula:

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinyl aromatic compounds include styrene, 4-methyistyrene, 3,5-diethylstyrene, 4-n-propylstyrene, α-methylstyrene, α-methyl vinyltoluene, α-chlorostyrene, α-bromostyrene, dichiorostyrene, dibromostyrene, tetrachiorostyrene mixtures thereof and the like. The preferred monovinylidene aromatic monomers used are styrene and/or a-methylstyrene.

Suitable vinyl cyanide monomers include acrylonitrile and substituted vinyl cyanides such as methacrylonitrile. The acrylonitrile and substituted acrylonitrile are described generically by the following formula:

wherein $R^1$ may be selected from the same group set out for R as previously defined. Examples of such monomers include acrylonitrile, ethacrylonitrile, methacrylonitrile, α-chloroacrylonitrile, and α-bromoacrylonifrile.

It should be noted that the monomers listed above are useful in the first step of polymerizing butadiene to make diene rubber latex, and also in the second step of the emulsion polymerization process to make ABS graft polymers.

Chain-transfer agents are added to the emulsion polymerization systems of the present invention in order to improve final polymer properties. Chain-transfer agents generally function as molecular weight modifiers. The chain-transfer agent reacts with a growing polymer chain to form a "dead" polymer with the concurrent formation of a new center for polymer growth. Typical agents are, for example, organic sulphur compounds, such as $C_1$–$C_{15}$ alkyl mercaptans, n-, i- and t-dodecyl mercaptan being preferred. It is recognized that the amount of chain-transfer agent employed will vary based on the particular chain-transfer agent ("CTA"), the monomer or mixture of monomers employed, the initiator employed, the polymerization reaction conditions, etc. In one embodiment, the CTA is added in the range of about 0.1 to 3 weight part of CTA per 100 weight part of the monomer.

In a second embodiment, the amount is about 0.1 to 2 weight part of CTA per 100 weight part of the monomer. In yet a third embodiment, the amount is about 0.2 to 0.5 weight part.

In one embodiment, about 10–50% of the chain transfer agents are added to the initial liquid batch composition, with the rest of the chain transfer agents being included with the continuous feed composition. In another embodiment, 100% of the chain transfer agents are added with the continuous feed.

Stabilizer and/or emulsifier are also added to the emulsion polymerization in such a manner that the final particle size of the finished latex is controlled. Emulsifiers are known and are commonly used in emulsion polymerization (D.C. Blackley, Emulsion Polymerization, chapter 7, Applied Science Publishers Ltd., London, 1975).

Emulsifiers which may be used according to the invention include the so-called anionic emulsifiers, such as higher fatty alcohol sulphates, higher alkyl sulphonates, alkylaryl sulphonates, aryl sulphonates, together with the condensation products thereof with formaldehyde, salts of sulphosuccinic acid esters and sulphated ethylene oxide adducts; the so-called non-ionic emulsifiers include the known reaction products of ethylene oxide with fatty alcohols, such as lauryl, myristyl, cetyl, stearyl and oleyl alcohol, with fatty acids, such as lauric, myristic, palmitic, stearic and oleic acid, and the amides thereof, and with alkylphenols, such as isooctyl-, isononyl- and dodecylphenol.

Emulsifiers are generally used in quantities of 0.1 to 10 wt. %, in particular of 0.2 to 8 wt. %, based on the total quantity of monomers used.

Free radical initiators well-known in the art are also employed in the emulsion process to enhance the reaction rate. The initiator can be introduced with the feed to maximize the heat generation rate early in the process. Examples of initiators include water soluble initiators, such as, for example, peroxygen compounds, especially inorganic persulfate compounds such as for example ammonium persulfate, potassium persulfate and sodium persulfate; peroxides such as for example hydrogen peroxide; organic hydroperoxides, such as for example cumene hydroperoxide t-butyl hydroperoxide, acetyl peroxide, lauroyl peroxide; peracetic acid and perbenzoic acid; redox initiators wherein a water soluble reducing agent such as a ferrous compound promotes the decomposition of peroxides, persulfates and the like; as well as other free radical producing materials such as 2,2'-azobisisobutyronitrile, 4,4'-azobis(4-cyanovaleric acid), and the like. In one embodiment, the initiator is a high activity redox initiator such as cumene hydroperoxide or other hydroperoxides in combination with other compounds such as reducing agents, heavy metal salts and complexing agents. In one embodiment, initiators are added to provide an initial reaction rate of about at least 10 percent of the total diene of the reaction reacted per hour. In another embodiment, between 15 and 20 percent.

A semi-batch process for the production of a diene-based rubber latex involves: a) providing the reaction system with an initial liquid batch composition comprising water, emulsifier, diene monomer, optionally a chain transfer agent, an initiator and/or co-monomers such as acrylonitrile and styrene, optionally inorganic and organic salts; b) feeding into the vessel a liquid feed composition comprising diene monomer and a chain transfer agent, optionally co-monomers such as acrylonitrile and styrene, and initiator in which the initiator may be dissolved in water; c) providing cooling during the continuous feeding; and d) reacting the diene monomer during and after the continuous feeding. The rate of feed is such that the level of unreacted diene monomer is minimized and peak heat generation occurs early in the process.

In one embodiment, the liquid batch composition also contains electrolytes, reducing agents, heavy metal salts and complexing agents. The initial liquid batch composition may contain from 10 to 30 weight percent of the total weight of diene monomer used in the process. In one embodiment, from 12 to 28 weight percent thereof. In another embodiment of the invention, from 15 to 25 weight percent thereof. This low level of initial diene monomer allows for greater reaction rate control.

The feed is to supply the remaining diene monomer and chain transfer agents to the reaction vessel over a period of time and at a controlled rate. The continuous feed occurs at a rate of between 5 and 20 volume present per hour based on the total volume of the initial batch liquid composition, and the feeding is completed during the first 2 to 12 hours of the process. Mixing is done during the reaction by using a stirrer.

In one embodiment of the present invention, the continuous feed composition includes diene monomer and 100% of the total amount chain transfer agents to be used in the reaction. In a second embodiment, the continuous feed includes about 80% of the total amount of chain transfer agents used. In one embodiment, the feed is controlled to achieve a final liquid volume of at least 80 volume % in the reactor based on the total volume of the reactor, and a diene monomer conversion of at least 80 wt. % on the total weight of diene used in the process. In another embodiment, the final liquid volume is 84 volume % and the diene monomer conversion is at least 90% based on the total weight of diene used in the process. In another embodiment, the conversion rate of the diene monomer is at least about 93%.

The initial liquid batch composition in to fill the reactor is about 40% to about 80% of the reactor volume. In one embodiment, from 50 to 70% thereof. In another embodiment, from 50 to 60%. The volume of the vessel is defined as the internal volume of the vessel available for occupation by the liquid and vapor containing diene reactant. The relatively low initial liquid level allows for a maximization of efficient vapor space cooling; and when utilizing a high activity initiator in the feed composition, the reaction rate and heat generation rate can be at a peak early in the process while the liquid level is relatively low and while the efficient vapor cooling space is maximized.

The reaction time of a semi-batch process is typically about 5–20 hours or so, with the reaction temperature ranging from about 120° F. to about 185° F. and preferably from about 135° F. to about 165° F. In one embodiment, the reaction time of the semi-batch process of the present invention is about 5 to 15 hrs. In a third embodiment, from about 8 to 12 hrs. The reactor pressure is typically between 20–150 psig depending on the reaction temperature. Reaction rate generally peaks during the first two hours of the reaction when the vapor space is greatest in the vessel, thereby allowing for the greatest level of vapor space cooling which is generally more efficient than the liquid space cooling.

In one embodiment of the present invention, the latex viscosity of the rubber latex is no greater than 200 centipoises (for example, as measured by using Automation Products, Inc. Model #CL-10 DV3 online viscometer). In another embodiment, it is between 50 and 200 centipoises throughout the reactor.

In one embodiment, the rubber latex produced has a number average particle size diameter of between 600

Angstroms and 1200 Angstroms, and has less than 10% by number of particles having diameters of less than 500 Angstroms. The viscosity of the reaction liquid is preferably less than 200 centipoises throughout the reactor.

In one embodiment of the invention, the final crosslink density (% A) of the polybutadiene is from about 10 to about 60 and in another embodiment, about 20 to about 50%. In a third embodiment, the final crosslink density (% A) of the polybutadiene is about 24–44%. The rubber crosslink density is represented as % A, which measurement method can be found in "Pulsed NMR Analysis of Polybutadiene Emulsion Polymerization Reactions: Preliminary Evidence for Changes in Cross-Link Density," Donald H. Ellington, GE Plastics, Bruker Minispec Application Note 36, 1991.

Delayed Addition of Third Monomer. In the second step of the emulsion polymerization process to make ABS, monovinylidene aromatic hydrocarbon monomers (e.g., styrene) and ethylenically unsaturated nitrile monomers (e.g., acrylonitrile) are polymerized in the rubber latex to form an ABS polyblend latex. In an example of a semi-batch process, an initial charge of substrate including water, surfactant and polybutadiene is made to a reaction system and at or after the conclusion of the completion of the initial charge, a pre-soak operation is carried out which include the addition of at least one of styrene, acrylonitrile or a mixture of styrene and acrylonitrile.

Applicants have found that the delay addition of a third monomer until the monomer conversion is greater than 98% surprisingly allows for a decrease in the amount of residual monomers or unreacted styrene NAVs. The conversion rate is based on the total conversion rate of the monovinylidene aromatic hydrocarbon monomers and ethylenically unsaturated nitrile monomers. The resultant ABS product has a low content of unreacted residual monomers. The delayed addition of a third monomer is referred herein as a "post-shot" addition. In another embodiment, a delay addition of an initiator was made in conjunction with the third monomer.

The third monomer to be added to the emulsion grafting reaction after the 98% plus monomer conversion point is selected on the basis of being highly reactive with the monomer formulation, including both the monovinylidene aromatic hydrocarbon monomer and the ethylenically unsaturated nitrile monomer. In one embodiment, the third monomer is a monomer having a low boiling point below 120° C. so that it can easily volatilized during the recovery of the polyblend from a latex by coagulation, washing, and drying.

The third monomers typically include at least one of methyl acrylate, ethyl acrylate, butyl acrylate, 2-ethylhexyl acrylate, cyclohexyl acrylate, benzyl acrylate, isopropyl acrylate, methyl methacrylate, ethyl methacrylate, butyl methacrylate, isopropyl methacrylate, isodecyl methacrylate, cyclohexyl methacrylate, benzyl methacrylate, acrylamide, methacrylamide, vinylidine chloride, vinylidine bromide, vinyl esters, such as, vinyl acetate, and vinyl propionate, dialkyl maleates or fumarates such as dimethyl maleate, diethyl maleate, dibutyl maleate, dimethyl fumarate, diethyl fumarate, and dibutyl fumarate. In one embodiment, the third monomer is selected from methyl acrylate and methyl methacrylate.

In one embodiment of a graft polymerization process to make ABS, the process includes charging the reaction system with a substrate such as diene rubber latex, adding a first portion of at least one of a styrene and one of an acrylonitrile to the diene rubber latex, adding to the reaction system, over a predetermined time, a catalyst (or initiator) and a second portion of at least one of acrylonitrile and styrene monomers, and polymerizing the catalyzed reaction mixture of diene rubber latex, styrene and acrylonitrile. The graft polymerization process may include an emulsifier, which is a molecule with a hydrophobic end and a hydrophillic end. As used herein, the term "substrate" refers to the rubber latex backbone onto which the styrene and acrylonitrile is grafted. In another embodiment, there is no pre-soak, or there is no addition of the first portion of styrene and/or acrylonitrile before the addition of the initiator.

In one embodiment, the substrate is a polybutadiene emulsion, dispersed in water with an emulsifying agent, such a fatty acid soap or a high molecular weight alkyl or alkaryl sulfate or sulfonate. In another embodiment, the substrate may be polybutadiene, styrene-butadiene rubber (SBR), acrylonitile-butadiene rubber (NBR), homopolymers of chloroprene, homopolymers of isoprene, copolymers of butadiene with isoprene, or chloroprene, 2-methyl-1,3-butadiene, 2,3-dimethyl-1,3-butadiene, 1,2-propadiene, 1,4-pentadiene, 1,5-hexadiene, 1,2-pentadiene and ABS. The substrate may be homogenized, unhomogenized, direct growth or chemically or colloidally agglomerated. When the graft reaction is carried out in semi-batch, batch, or continuous fashion, it is desired to utilize a homonogenized substrate. Typically, the average particle size of the substrate about 150 nanometers to about 500 nanometers. If direct growth substrate is employed, the particle size distribution is about 60 nanometers to about 500 nanometers.

The catalyst or initiator used in the graft reaction includes peroxides and/or azo compounds which are active in grafting and decompose into radicals. In addition to redox initiators, peroxy initiators which have the capability to provide free radicals to the reaction may also be used. Examples include cumene hydroperoxide (CHP), sodium persulfate, potassium persulfate, ammonium persulfate, di-isopropylbenzene hydroperoxide, tertbutyl-peroxide, and 2-2'azo-bis-isobutyrylnitrile (AIBN), in combination with other compounds such as reducing agents, heavy metal salts and complexing agents. In one embodiment, the initiator is cumene hydroperoxide in combination with a redox catalyst, such as, Fe(II) with sugar or vanadium with sugar. Thermal initiators should provide similar results if sufficient polymerization rates can be obtained. A single initiator system or multiple initiator additions over intervals of time can be employed. The initiator(s) are added at various times including at the beginning of the addition of the third monomer, during the addition of the third monomer, at or after the completion of the addition of the third monomer. If desired, one or more late addition monomers may be employed.

In one embodiment, initiator is added to the reaction system in an amount to provide sufficient initiator for the duration of the polymerization reaction. In another embodiment, the initiator or catalyst is included within the range of 0.01 to 2 percent by weight of the polymerizable monomer. In a second embodiment, initiator is added in an about of about 0.1 to 0.5 wt. % of the polymerizable monomer. In yet another embodiment, initiator is added during the addition of monomer formulation to ensure favoring of the grafting reaction.

In alternate embodiments of the present invention, the post-shot addition of the third monomer and/or initiator is delayed until the conversion of styrene and acrylonitrile monomers is greater than about 98% in one embodiment, or greater than 99% in another embodiment, or greater than 99.5% in a further embodiment, based on the original acrylonitrile monomer charged to the reaction polymerization system.

Emulsifying agents which may be used in the graft polymerization process include a fatty acid soap, an alkaline metal or ammonium soap of a high molecular weight alkyl or alkaryl sulfate or sulfonate, etc., in total amounts of about 0.1 to 8 parts by weight per 100 parts by weight of the monomer formulation.

The afore-described process may be carried out in a batch, semi-batch, or continuous operation. If in a semi-batch operation, then an initial charge of substrate including water, surfactant and polybutadiene is made to a reaction system and at or after the completion of the initial charge, a pre-soak operation may be carried out which include the addition of at least one of styrene, acrylonitrile or a mixture of styrene and acrylonitrile. In one embodiment, the temperature of the reaction system varies from about 100° F. to about 200° F. In a second embodiment, from about 120° F.–180° F. In a third embodiment, from about 130° F. to about 160° F.

Sufficient heat removal is carried out as by the use of heat exchangers so that the reaction system is maintained at a satisfactory temperature to provide satisfactory polymerization. Stirring is employed in the reaction system. The amount of stirring and type is that amount and type which produces good dispersion of the reactor contents and the desired amount of heat transfer.

Maintenance of the appropriate ratio of monovinylidene aromatic hydrocarbon monomer to ethylenically unsaturated nitrile monomer Applicants have also found that when the ratio of unreacted styrene to acrylonitrile in the emulsion polymerization process is kept at a ratio of greater than about 1.5 to 1, the final compounded products are characterized with low yellowness by keeping the reaction rich in styrene.

In one embodiment wherein a third monomer is to be added late in the reaction, the ratio of total styrene monomer added to acrylonitrile monomer added is about 1.5 to 1 to about 4 to 1, and in another exemplary embodiment, about 2 to 1 to about 3.5 to 1.

In one embodiment, the ratio of total diene rubber added to the total of styrene monomer and acrylonitrile monomer is about 0.1 to 1 to about 3.0 to 1, and in another exemplary embodiment, about 0.2 to 1 to about 2 to 1.

In still another embodiment, the post-shot addition of the third monomer is delayed until the conversion of acrylonitrile is greater than about 99% and the ratio of unreacted styrene to unreacted acrylonitrile monomer is greater than about 4 for a final product that is low in yellowness and residual monomers.

In one embodiment, at least one of acrylonitrile and styrene monomers are added to the reaction system over a time of about 30 minutes to about 200 minutes. In another embodiment, at least one of acrylonitrile and styrene monomers are added to the reaction system over a time of about 45 minutes to about 160 minutes.

The ratio of the first portion of styrene monomer to the second portion of styrene monomer is about 1 to 3 to about 1 to 5 and the ratio of a first portion of acrylonitrile monomer to the second portion of acrylonitrile monomer is about 1 to 3 to about 1 to 5. In one embodiment, a first portion of at least one of styrene monomer and acrylonitrile monomer or a mixture thereof is added to the polybutadiene emulsion. In another embodiment, there is one addition of styrene monomer and one addition of acrylonitrile monomer.

In another embodiment, after permitting the reaction to proceed for about 40 to 90 minutes after the addition of the initiator, the acrylonitrile monomer, and the styrene monomer is completed, about 0.5 to about 5.0 parts of a third monomer per 100 parts of total polymer and monomer, and/or additional initiator is added to the reaction mixture.

Optimizing the rubber crosslink density of the substrate: As previously noted, when a third monomer is added at 90–95% conversion, good NAV reduction is achieved in the graft ABS polymer, and surprisingly excellent results in NAV reduction is achieved when the third monomer is added later on at 98 and 99%. However, with the late addition of a third monomer, whether at 90% plus or 99% plus, the impact properties of the ABS graft polymer are poor. In the present invention, Applicants have found a method of optimizing the impact of the ABS graft polymer, by optimizing the rubber crosslink density of diene substrate, and selecting the appropriate rubber crosslink density associated with the desired room temperature and/or low temperature impact strength of the ABS graft polymer (thus offsetting the low impact strength associated with the late addition of a third monomer).

When this embodiment is employed along with the afore-recited embodiments above, the addition of a third monomer and lowering the crosslink density % A, the resultant product has a low content of unreacted residual monomers along with a uniquely improved impact strength.

In the present invention, a flow-impact balance in an ABS graft polymer product is obtained while achieving higher conversion and reduced monomer emissions, by offsetting the crosslink density (% A) increase in the ABS graft polymer (due to increased conversion) by selecting the diene substrate of lower crosslink density (% A).

In one embodiment of the invention, the diene substrate has a crosslink density of 20–60% A. In a second embodiment, it is 25–45% A. In yet another embodiment, an optimum product performance is obtained with a crosslink density of 30–45% of the diene substrate.

It should be noted that the emulsion polymerization reaction of the present invention can be carried out in a batch process, a semi-batch process, or a continuous process.

EXAMPLES

The invention will be further described by reference to the following examples which are presented for the purpose of illustration only and are not intended to limit the scope of the invention.

Examples 1–13 are baseline runs, showing the preparation of a high rubber ABS graft polymer by grafting polybutadiene with styrene and acrylonitrile in accordance with an embodiment of the present invention. Examples 1–13 were prepared according with the following general procedure. An initial charge of a polybutadiene emulsion was added to a three liter reaction vessel and heated to 57.2° C. Next, 12.06 parts by weight of styrene were added to the reaction vessel as a "pre-soak". After a pre-soak of about 20 minutes an addition of 0.375 parts of cumene hydroperoxide initiator was started. The initiator was added to the reaction vessel over a period of 70 minutes. Five minutes after starting the initiator addition, a feed of 12.05 parts of acrylonitrile was started. The acrylonitrile was added to the reaction vessel over a period of 65 minutes. Ten minutes after the start of the initiator addition, a feed of 24.09 parts of styrene was started. The styrene was added to the reaction vessel over a period of 60 minutes.

In the baseline run with no late addition of a third monomer, it is noted that the final product is high in NAVs.

Example 14 is a comparative example and was prepared similar to the baseline runs of Examples 1–13 described above, except that there was no addition of styrene to the polybutadiene emulsion prior to the start of the initiator addition. Instead, the entire amount of styrene, 36.15 parts, was feed into the reaction vessel over a period of 60 minutes starting ten minutes after the start of the initiator feed. Upon completion of the reaction, the reaction product was analyzed for residual styrene and acrylonitrile monomers and is shown in Table 1 below. Again, the run was high in NAVs with more than 3500 parts per million (ppm) of styrene. The results are follows:

TABLE 1

| EXAMPLE | Polybutadiene Emulsion | Residual Styrene (ppm) | Residual Acrylonitrile (ppm) |
|---|---|---|---|
| 1 | A* | 4938 | 1303 |
| 2 | A* | 2497 | 2561 |
| 3 | A* | 4389 | 1031 |
| 4 | A* | 4683 | 1349 |
| 5 | B** | 5098 | 1533 |
| 6 | B** | 4892 | 679 |
| 7 | B** | 3388 | 1134 |
| 8 | B** | 3950 | 1046 |
| 9 | B** | 4004 | 861 |
| 10 | B** | 3538 | 1415 |
| 11 | B** | 3320 | 1305 |
| 12 | B** | 4285 | 1735 |
| 13 | B** | 3800 | 775 |
| 14 | B** | 6900 | 575 |

*Emulsion A is an homogenized emulsion of polybutadiene having an average particle size of 290 to 320 nanometers with a crosslink density of 56% A.
**Emulsion B is an homogenized emulsion of polybutadiene having an average particle size of 290 to 320 nanometers with a crosslink density of 30–36% A.

Examples 15–31 show the preparation of ABS in accordance with the late addition of a third monomer. In the examples, polybutadiene is grafted with styrene and acrylonitrile in a process that does not include a "pre-soak," but includes a "post-shot" of a monomer that is reactive with styrene and acrylonitrile. The examples were prepared according with the following general procedure. An initial charge of a polybutadiene emulsion B was added to a three liter reaction vessel and heated to 57.2° C. Next, 0.475 parts of CHP initiator was added. The initiator was added to the reaction vessel over a period of 70 minutes (Examples 15–27) or 85 minutes (Examples 28–31). The start of the initiator is T=0. At T=0, a feed of acrylonitrile and a feed of styrene were started. The acrylonitrile was added to the reaction vessel over a period of 70 minutes (Examples 15–27) or 90 minutes (Examples 28–31). At a time of between T=110 minutes and T=160 minutes a post-shot of initiator and a post shot of a monomer is added to the reaction vessel over a period of 5 minutes. In Examples 28 and 30, the post-shot of initiator and monomer was a batch addition. See Table 2 for the amounts and the initiators and added monomers for each example.

Upon completion of the reaction, the reaction product was analyzed for residual styrene and acrylonitrile monomers. It is desirable to have less than 3500 parts per million (ppm) of styrene and less than 1500 ppm of acrylonitrile in the final product. It is noted that the late addition of the third monomer in accordance to the present invention (Post shot T of 135 and 160 minutes) gives surprisingly lower residual styrene and acrylonitrile compared to the earlier addition of the third monomer as in the prior art (Post shot T of 110 minutes).

It should be noted that it appears that the lower post-shot start time (T) yields lower residual monomer. For example, see Examples 15 and 18, Examples 27 and 16, Examples 23 and 26, and Examples 20 and 21.

TABLE 2

| Ex. | AN (parts) | Styrene (parts) | PB (parts) | Post-Shot T= | Post-Shot Init. | Post-Shot Init. (parts) | Post-Shot Mon. | Post-Shot Mon. (parts) | Residual Styrene (ppm) | Residual AN (ppm) |
|---|---|---|---|---|---|---|---|---|---|---|
| 15 | 11.800 | 35.400 | 51.800 | 110 | CHP | 0.150 | MMA | 1.000 | 4214 | 168 |
| 16 | 11.300 | 33.900 | 51.800 | 160 | CHP | 0.250 | MMA | 3.000 | 1162 | 163 |
| 17 | 11.550 | 34.650 | 51.800 | 135 | CHP | 0.200 | MMA | 2.000 | 1809 | 519 |
| 18 | 11.800 | 35.400 | 51.800 | 160 | CHP | 0.150 | MMA | 1.000 | 2957 | 139 |
| 19 | 11.300 | 33.900 | 51.800 | 110 | CHP | 0.075 | MMA | 3.000 | 1337 | 204 |
| 20 | 11.300 | 33.900 | 51.800 | 110 | CHP | 0.150 | MMA | 3.000 | 1862 | 131 |
| 21 | 11.300 | 33.900 | 51.800 | 160 | CHP | 0.150 | MMA | 3.000 | 974 | 97 |
| 22 | 11.550 | 34.650 | 51.800 | 135 | CHP | 0.200 | MMA | 2.000 | 1806 | 120 |
| 23 | 11.800 | 35.400 | 51.800 | 110 | CHP | 0.250 | MMA | 1.000 | 3566 | 119 |
| 24 | 11.550 | 34.650 | 51.800 | 135 | CHP | 0.200 | MMA | 2.000 | 1168 | 147 |
| 25 | 11.800 | 35.400 | 51.800 | 160 | CHP | 0.250 | MMA | 1.000 | 5543 | 267 |
| 26 | 11.800 | 35.400 | 51.800 | 160 | CHP | 0.250 | MMA | 1.000 | 2596 | 48 |
| 27 | 11.300 | 33.900 | 51.800 | 110 | CHP | 0.250 | MMA | 3.000 | 1504 | 220 |
| 28 | 11.687 | 35.060 | 50.244 | 110 | PPS | 0.200 | BA | 3.000 | 660 | 693 |
| 29 | 11.687 | 35.060 | 50.244 | 110 | CHP | 0.200 | BA | 3.000 | 686 | 527 |
| 30 | 11.687 | 35.060 | 50.244 | 135 | PPS | 0.200 | BA | 3.000 | 756 | 527 |
| 31 | 11.687 | 35.060 | 50.244 | 160 | CHP | 0.200 | BA | 3.000 | 738 | 417 |

AN = acrylonitrile; PB = polybutadiene; CHP = cumene hydroperoxide; PPS = potassium persulfate; MMA = methymethacrylate; and BA = butylacrylate, Init. = initiator; Mon. = monomer. T is time measured in minutes from first initiator feed.

In the comparative base run Example 32, 50 parts of styrene and acrylonitrile were added in a 3:1 ratio to an emulsion containing 50 parts of polybutadiene. The emulsion polymerization was initiated by means of a CHP redox system using Fe(II) and sugar. The monomers were fed into the emulsion over a period of 70 minutes but 12 parts of the styrene are added prior to the pumping of the initiator and the remaining monomers. At the end of 70 minutes, the total solid was about 36% and styrene and acrylonitrile levels were 3800 and 1500 ppm respectively.

In Examples 33–38 of the present invention, there was no styrene presoak. The reaction was carried otherwise in the same manner of semi-batch emulsion polymerization conditions. There was a delay of 40 or 90 minutes (for post shot time of 110 or 160 minutes) until the addition of the methyl methacrylate monomer (MMA) in conjunction with additional CHP initiator. It was noted that for each case, either with 1 part MMA or 3, 0.15 or 0.25 parts of CHP, total residual monomer was surprisingly less with late addition time as compared to the base run.

TABLE 3

| Ex. | Post shot time | Parts MMA | Parts CHP | Residual Styrene (ppm) | Residual AN (ppm) | Residual MMA (ppm) | Total residual (ppm) |
|---|---|---|---|---|---|---|---|
| 33 | 110 | 1 | 0.15 | 4214 | 168 | 248 | 4630 |
| 34 | 160 | 1 | 0.15 | 2957 | 139 | 451 | 3548 |
| 35 | 110 | 1 | 0.25 | 3566 | 119 | 288 | 3973 |
| 36 | 160 | 1 | 0.25 | 2596 | 48 | 458 | 3102 |
| 37 | 110 | 3 | 0.15 | 1862 | 131 | 788 | 2782 |
| 38 | 160 | 3 | 0.15 | 974 | 97 | 745 | 1816 |
| 39 | 110 | 3 | 0.25 | 1504 | 220 | 1246 | 2970 |
| 40 | 160 | 3 | 0.25 | 1162 | 163 | 953 | 2278 |

In Examples 41–47, polybutadiene was at 50 parts, the styrene was 37 parts, and acrylonitrile 13 parts. Some of the styrene was pre-soak, i.e., added to the polybutadiene prior to the beginning of the polymerization with acrylonitrile.

Applicants have found that the best conversion is obtained under the conditions with a pre-soak, and also extended time delivery of the initiator, and that the lowest color materials (most desirable in terms of low Yellowness Index) have the highest ratio of unreacted styrene to acrylonitrile while the most colored materials have substantial acrylonitrile. We also found that adding the styrene in the pre-soak allows for higher conversion, but at the expense of higher color.

TABLE 4

| Examples | styrene pre-soak | CHP parts | CHP pump/time | Styrene feed/time | ppm AN | ppm styrene | YI@ 400 F. | YI@ 450 F. | YI@ 500 F. |
|---|---|---|---|---|---|---|---|---|---|
| 41 | 0 | 0.375 | 130 | 110 | 0 | 7633 | 24.8 | 25.7 | 26.2 |
| 42 | 0 | 0.375 | 100 | 90 | 373 | 5719 | 25.4 | 27.4 | 28.6 |
| 43 | 0 | 0.475 | 100 | 110 | 0 | 6849 | 25.8 | 26.3 | 26.8 |
| 44 | 7.5 | 0.425 | 115 | 100 | 412 | 4715 | 28.2 | 29.0 | 29.8 |
| 45 | 15 | 0.375 | 100 | 110 | 705 | 8314 | 28.4 | 28.9 | 29.9 |
| 46 | 15 | 0.375 | 130 | 90 | 1467 | 1693 | 29.8 | 30.8 | 31.5 |
| 47 | 15 | 0.475 | 100 | 90 | 930 | 2255 | 33.1 | 34.3 | 35.4 |

EXAMPLE 48. In this example, a design of experiments (DOE) 5 five factors (CHP level initially, styrene/acrylonitrile feed time, CHP level in post-shot, methyl methacrylate level in post-shot, timing of post-shot) was conducted for a total of 19 runs. A statistical analysis of the Yellowness Index (YI) showed that the YI is not impacted by the late addition of the third monomer, as indicated below:

| Term | Coef | StDev | T | P |
|---|---|---|---|---|
| Constant | 25.7837 | 0.1800 | 143.241 | 0.000 |
| CHP shot | 0.2800 | 0.1962 | 1.427 | 0.174 |
| Monomer feed time | 0.3887 | 0.1962 | 1.982 | 0.066 |
| MMA Loading | −0.2450 | 0.1962 | −1.249 | 0.231 |

As shown above, the statistically significant factor with respect to the YI is from the monomer feed time, i.e., from the maintenance of the appropriate ratio of unreacted styrene to acrylonitrile.

EXAMPLE 49. In this example, butadiene substrates were made by a batch process using 85/15 weight ratio of butadiene/styrene at different crosslink density levels of % A, and then pressure homogenized. Graft reactions were run on the homogenized substrates at 51.3 parts rubber. Styrene monomers at 34 parts, acrylonitrile at 11.7 parts and MMA at 3 parts were used for grafting. MMA was added 30 minutes after the styrene and acrylonitrile charge was completed. % A's were measured on the ABS graft polymer.

The results are as follows correlating the crosslink density of the butadiene rubber and the product ABS graft polymer:

| % A of substrate | % A of HRG |
|---|---|
| 21.6 | 56.9 |
| 30.3 | 60.4 |
| 42.1 | 64.1 |
| 51.8 | 69.4 |

EXAMPLE 50. The ABS graft polymers in Example 49 were blended with SAN, compounded, and molded into bars for the notched Izod impact measurement at room temperature. The results are as follows.

| % A of HRG | Izod Impact (kJ/m2) |
|---|---|
| 56.9 | 17.0 |
| 60.4 | 16.0 |
| 64.6 | 13.6 |
| 69.4 | 12.3 |

Figure 1:
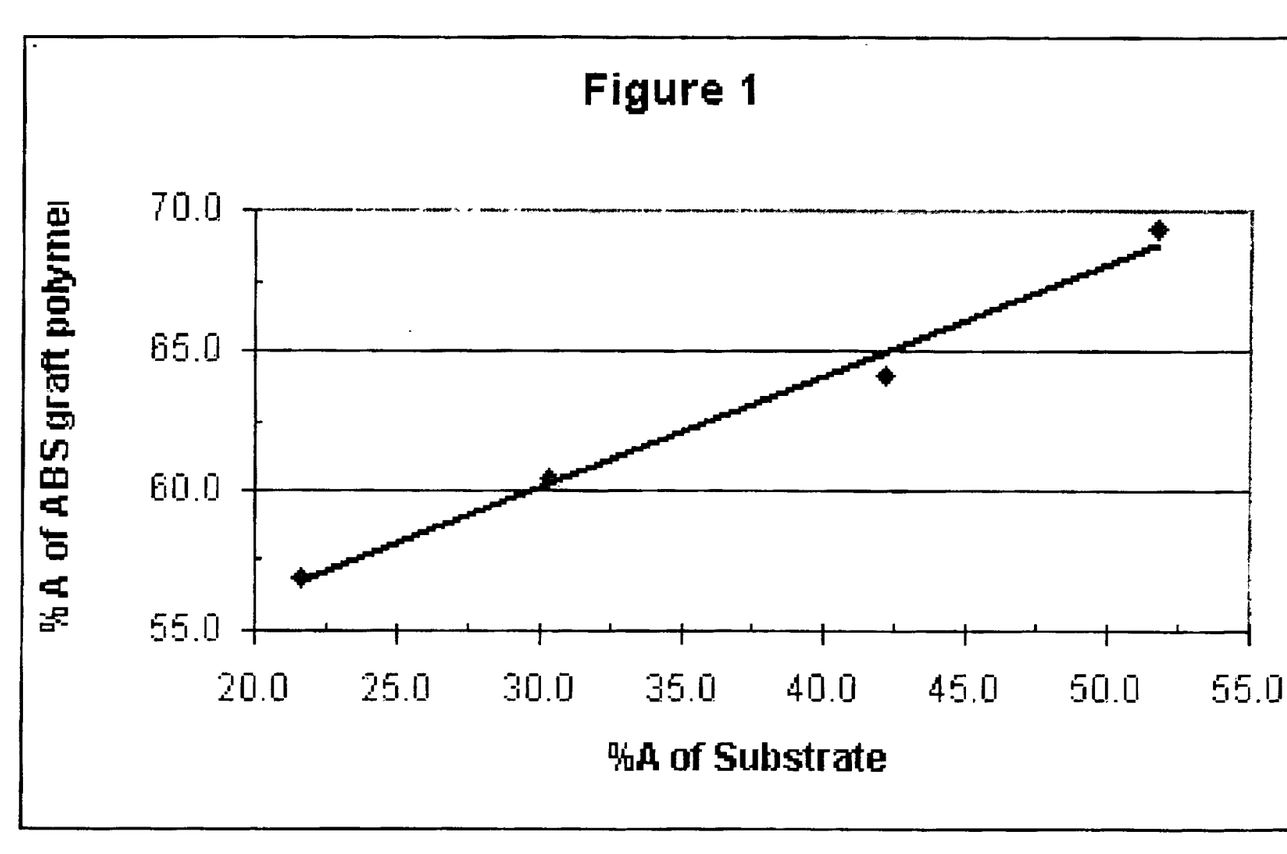
FIG. 1 shows the dependence of rubber crosslink density (% A) of an ABS graft polymer on rubber crosslink density (% A) of a substrate.
Figure 2:
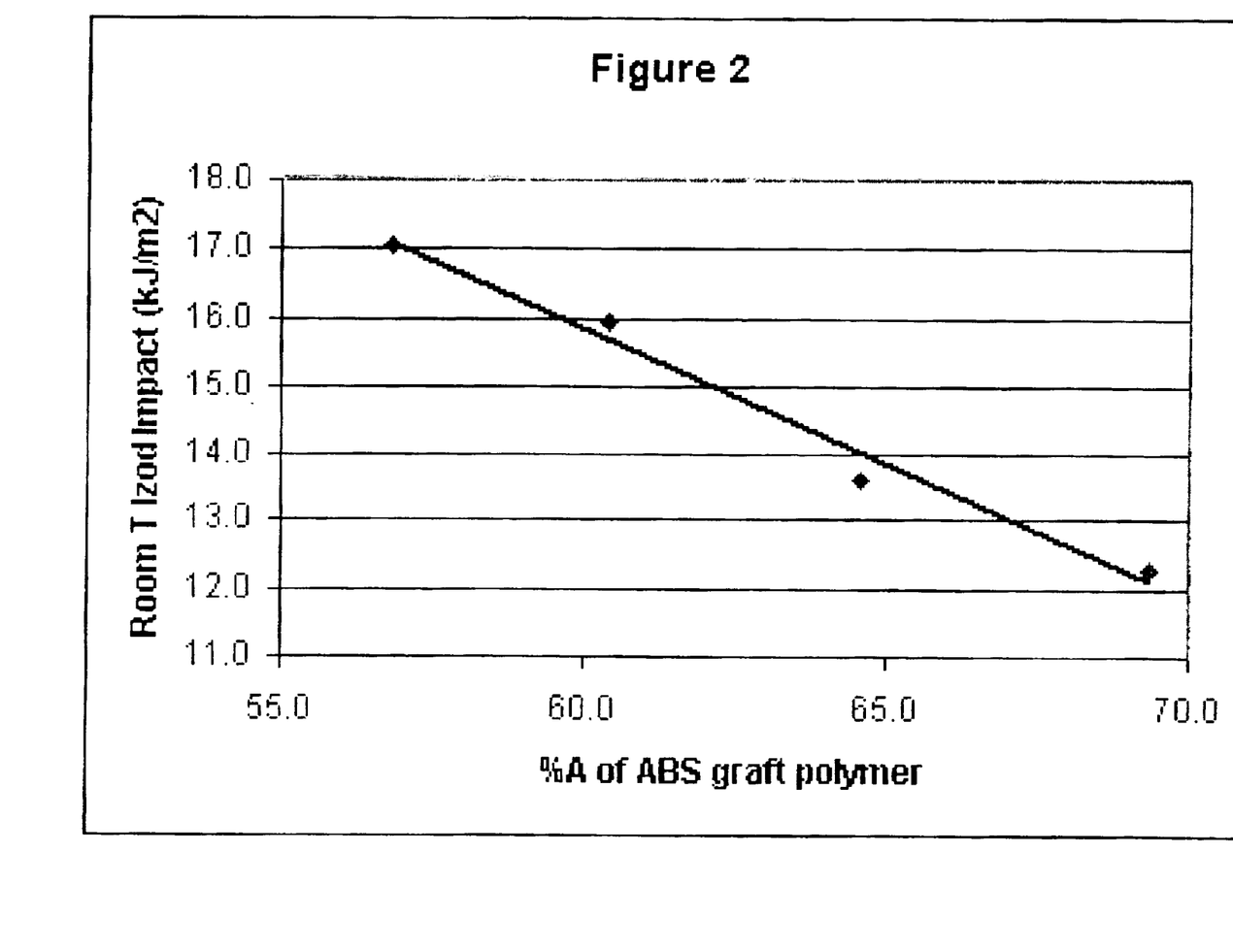
FIG. 2 shows the dependence of notched Izod impact at room temperature on rubber crosslink density (% A) of the ABS graft polymer.

FIG. 1 and FIG. 2 are plots of data indicating the role that the rubber crosslink density of diene rubber has in defining room temperature and low temperature impact of ABS graft polymer. As shown in FIG. 1, it has been discovered that the polybutadiene substrate provides a baseline for the crosslink density of rubber in ABS graft polymer. In FIG. 2, the room temperature notch Izod impact strength is enhanced when substrate crosslink density of the ABS graft polymer is lower. As a correlation, the notched Izod impact strength is dependent on the rubber crosslink density of the substrate.

Figure 3:
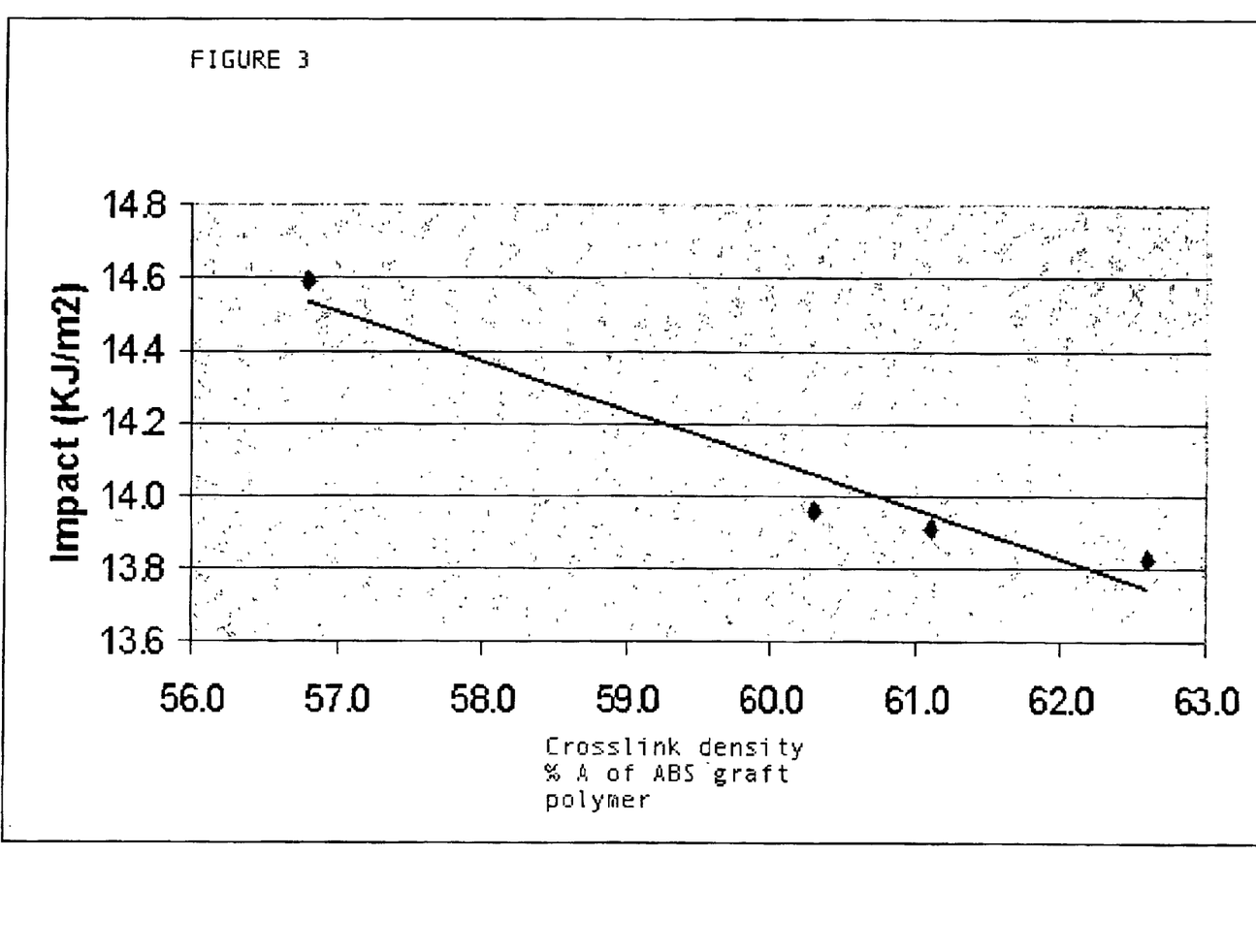
FIG. 3 shows the dependence of notched Izod impact at low temperature (−20° C.) on rubber crosslink density (% A) of the ABS graft polymer.

FIG. 3 below shows the dependence of notched Izod impact at $-20°$ C. on crosslink density (% A) of the rubber in an ABS graft product, containing 70% polybutadiene rubber.

EXAMPLE 51. (30 runs total). A design of experiments (DOE) of 2-level, four factor, full factorial response surface central composite design (alpha of 1) was carried out according to the factors and settings as shown in table below. Applicant's 30 runs, including 6 repeats of the center point, showed the effect of conversion and rubber crosslink density and to optimize the flow and low temperature impact.

TABLE 5

DOE Factors and Settings of Graft Reaction

| | | | DOE Settings | | |
|---|---|---|---|---|---|
| Factor | Factor Description | Unit | Low | Medium | High |
| A | Rubber Level in ABS Graft Polymer | Parts* | 60 | 65 | 70 |
| B | Crosslink Density (% A) of Substrate Used | | 28.3 | 39.8 | 54.8 |
| C | Chain Transfer Agent (TDDM) Used | Parts* | 0.0 | 0.1 | 0.2 |
| D | Initial Temp of Reaction | °F. | 134 | 140 | 146 |

*Parts = Parts per hundred parts of ABS graft polymer to be formed

Water and the required amount of polybutadiene substrate (to result in the desired rubber level in the ABS graft polymer according to the settings chosen in the DOE) were charged to the reactor. The crosslink density of the polybutadiene substrate was changed from reaction to reaction according to the settings in the DOE. After the batch is lined out at the initial temperature (which varied from reaction to reaction according to the settings chosen in the DOE), the redox system solutions of $FeSO_4$/Tetrasodiumpyrophosphate/Fructose were added. The initiator (CHP), styrene monomer, acrylonitrile monomer, and chain transfer agent (t-DDM) feed pumps were started, while the reactor was maintained at the initial temperature specified in the DOE. The styrene to acrylonitrile ratio was maintained at about 3 to 1. The amounts varied from reaction to reaction such that the parts of polybutadiene, styrene, acrylonitrile and methyl methacrylate added up to a total of 100 parts. The monomer charges were completed in about 45 minutes. When 50 minutes had elapsed after the start of the monomer addition, 3 parts of methyl methacrylate were added over a period of 5 minutes and another aliquot of CHP "post-shot" was started at the same time and was charged over a period of 30 minutes. The reaction temperature was gradually raised by 8° F. in the first 40 minutes once the monomer charges began, and then raised again to 160° F. in the next 20 minutes, where it was held constant for the next 60 minutes. The resulting ABS graft polymer latex was aged for about 5 hours, and appropriate amount of an anti-oxidant emulsion was added and aged again for another 3 hours. The latex was then coagulated with acid, and ABS graft polymer was isolated and dried. Just before coagulation the latex was tested for the content of residual monomers (NAVs). The dried polymer was blended with styrene-acrylonitrile (SAN) polymer by melt-mixing, molded into test bars and tested for notched Izod impact.

Figure 4:
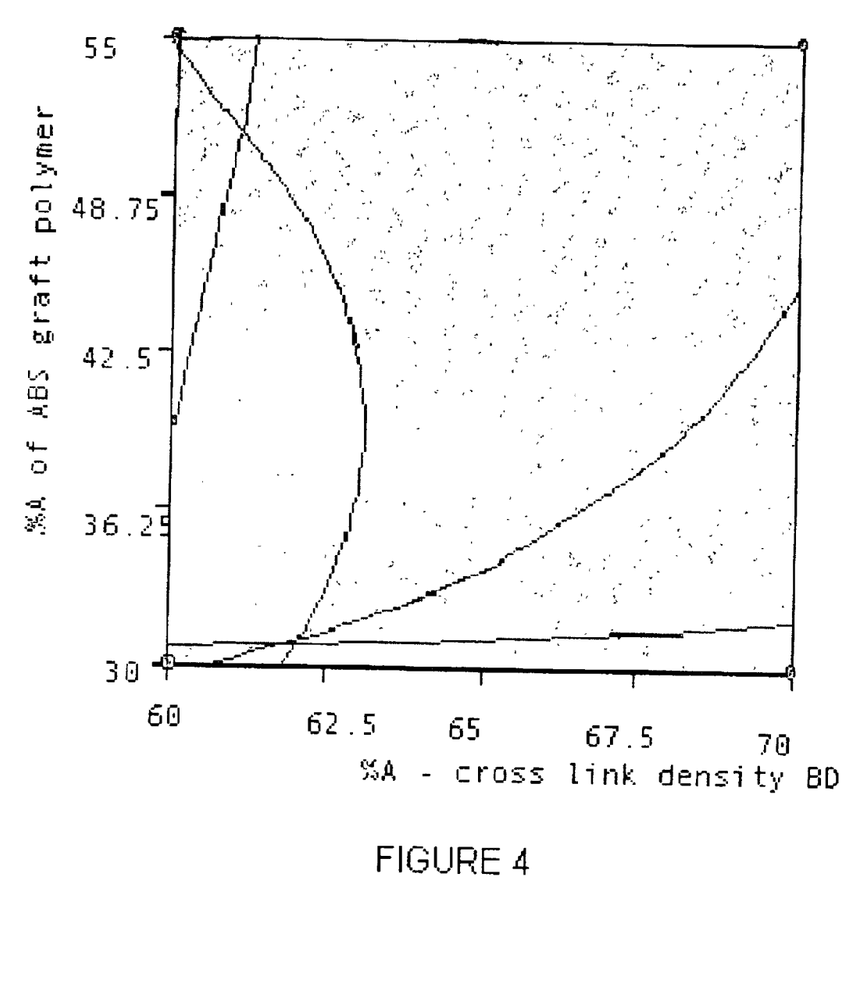
FIG. 4 is an overlay plot showing the optimum crosslink density of rubber (% A) in a substrate needed for low temperature (−20 C.) notched Izod impact, while meeting low NAV requirements.

FIG. 4 is representation of the results of the DOE, showing the optimum crosslink density of rubber (% A) in the polybutadiene substrate needed for low temperature ($-20$ C.) notched Izod impact, while exhibiting low non-aqueous volatile (NAVs). As shown in the Figure, an ABS graft polymer can be designed with non-aqueous volatiles (NAVs) in desired levels, by choosing the substrate appropriate crosslink density which meets impact requirements. Thus, it is possible to maintain the flow-impact balance in an ABS graft polymer but still be able to achieve higher conversion in a ABS graft polymer polymerization process to reduce NAV and hence reduce emissions. This is achieved by offsetting the % A increase in ABS graft polymer (due to increased conversion) by selecting the polybutadiene substrate of lower crosslink density (% A).

Example 50 (21 Runs)

In this example, a fractional factorial DOE ($2^{(6-2)}$ plus center points) of 21 runs was conducted to determine the best approach to control crosslink density. The DOE factors varied are described below in Table 6.

| Factor | Description | Units | Low level | Center pt. | High Level |
|---|---|---|---|---|---|
| A | TFA Soap charge level | pphm | 1.50 | 2.00 | 2.50 |
| B | Butadiene BD charge level | pphm | 15.0 | 20.00 | 25.0 |
| C | Initial CHP feed rate | pphm/hr | 0.0028 | 0.0098 | 0.0168 |
| D | Initiation temperature | °F. | 142 | 145 | 148 |
| E | t-DDM charge level | pphm | 0.20 | 0.60 | 0.80 |
| F | t-DDM feed level | pphm/hr | 0 | 0.06 | 0.12 | pphm: parts per 100 parts of BD monomer

The initial charge of the reactor for the runs included: 150 parts water, 0.01 part ferrous sulfate FeSO4, 0.0039 EDTA; 0.4 part tetra sodium pyrophosphate or TSPP; "E" parts of t-DDM as indicated in the DOE factors table; "B" parts of butadiene charge level as indicated in table above; and 0.050 parts of sodium formaldehyde sulfoxalate dyhydrate SFS.

The feeds for the runs were as follows: "C" parts of initial CHP for the $1^{st}$ hour; 0.0882 parts of CHP until completion of reaction at a rate of 0.0126 pphm (parts per 100 parts of monomer); Butadiene monomer feed at a rate of 100-"B" in the table above, spread over a period of 5 hr. reaction time; and "F" parts t-DDM, spread over a period of 5 hr. reaction time.

The initiation temperature was at "D" with the polish temperature (after the BD feed stops) of 160° F.

The reaction procedure included first pulling a vacuum on the reactor and then adding the initial charge of water, $FeSO_4$, ETDA, TFA soap, TSPP, initial TDDM, and the initial butadiene monomer. The reaction mixture was heated to an initiation temperature and then the SFS was added. The reaction mixture was then mixed for five minutes and then the CHP feed was started. Ten minutes after the start of the CHP feed the butadiene and the t-DDM feeds were started. At the conclusion of the butadiene and t-DDM feeds, the temperature of the reaction mixture was raised to the polish temperature. The CHP feed was continued until a conversion of between 93% to 96% was obtained and then the reaction mixture was cooled to 150° F. Any un-reacted butadiene was removed by vacuum and then the resultant latex was homogenized to the desired particle size. The results are as shown in Table 7.

TABLE 7

| Run order | Soap Level pphm | BD charge level pphm | initial CHP feed pphm/hr | Initiation temp. °F. | tddm charge level pphm | tddm feed level pphm | % A |
|---|---|---|---|---|---|---|---|
| 1 | 2.5 | 25.0 | 0.0028 | 148 | 0.20 | 0.00 | 60.5 |
| 2 | 1.5 | 15.0 | 0.0028 | 148 | 0.20 | 0.60 | 18.4 |
| 3 | 2.0 | 20.0 | 0.0098 | 145 | 0.50 | 0.30 | 35.4 |
| 4 | 1.5 | 15.0 | 0.0168 | 142 | 0.80 | 0.60 | 13.7 |
| 5 | 2.5 | 15.0 | 0.0028 | 142 | 0.80 | 0.00 | 55.2 |
| 6 | 1.5 | 15.0 | 0.0028 | 142 | 0.20 | 0.00 | 62.0 |
| 7 | 1.5 | 25.0 | 0.0168 | 148 | 0.20 | 0.60 | 21.6 |
| 8 | 1.5 | 15.0 | 0.0168 | 148 | 0.80 | 0.00 | 55.1 |
| 9 | 1.5 | 25.0 | 0.0028 | 148 | 0.80 | 0.00 | 41.7 |
| 10 | 2.0 | 20.0 | 0.0098 | 145 | 0.50 | 0.30 | 35.0 |
| 11 | 1.5 | 25.0 | 0.0168 | 142 | 0.20 | 0.00 | 62.1 |
| 12 | 2.0 | 20.0 | 0.0098 | 145 | 0.50 | 0.30 | 35.3 |
| 13 | 2.5 | 25.0 | 0.0028 | 142 | 0.20 | 0.60 | 18.9 |
| 14 | 1.5 | 25.0 | 0.0028 | 142 | 0.80 | 0.60 | 9.1 |
| 15 | 2.0 | 20.0 | 0.0098 | 145 | 0.50 | 0.30 | 37.6 |
| 16 | 2.5 | 15.0 | 0.0028 | 148 | 0.80 | 0.60 | 17.0 |
| 17 | 2.0 | 20.0 | 0.0098 | 145 | 0.50 | 0.30 | 38.3 |
| 18 | 2.5 | 15.0 | 0.0168 | 148 | 0.20 | 0.00 | 64.7 |
| 19 | 2.5 | 15.0 | 0.0168 | 142 | 0.20 | 0.60 | 34.5 |
| 20 | 2.5 | 25.0 | 0.0168 | 142 | 0.80 | 0.00 | 52.3 |
| 21 | 2.5 | 25.0 | 0.0168 | 148 | 0.80 | 0.60 | 20.6 |

Figure 5:
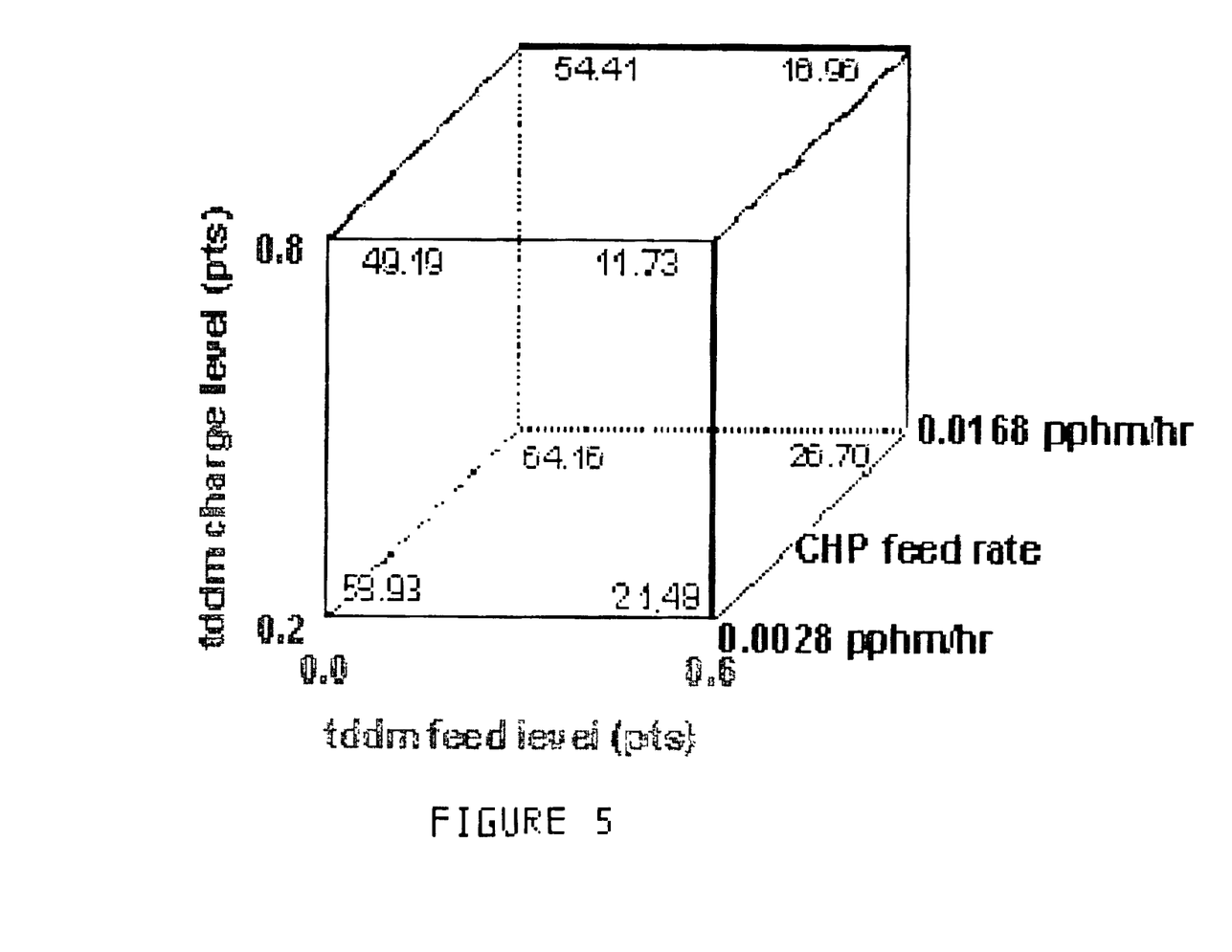
FIG. 5 is a plot of the results of a design of experiments (DOE), showing the correlation of a continuous feed of the chain transfer agent t-DDM feed with the crosslink density of diene rubber substrate.

The DOE results as shown in FIG. 5 indicate that low crosslink density polybutadiene substrate made with the semi-batch process can be achieved by the continuous addition of t-DDM during the butadiene feed portion of the reaction. Batch charging of t-DDM is not effective at reducing the crosslink density below 49%. The addition of t-DDM during the feed portion, instead of adding up front at the beginning, is about 4 times more effective at reducing the crosslink density. Therefore, similar crosslink density can be achieved using lower amounts of t-DDM. The lower crosslink density is beneficial when used in graft ABS reactions to achieve better low temperature impact at high conversion.

While the invention has been described in terms of various specific embodiments, those skilled in the art will recognize that the invention can be practiced with modification within the spirit and scope of the claims.

What is claimed is:

1. A method of optimizing the impact strength of an ABS graft polymer product while achieving higher conversion and reduced monomer emissions in preparing said ABS graft polymer product, by offsetting an increase in crosslink density % A in said ABS graft polymer with a selection of a diene substrate having a low crosslink density % A to prepare said ABS graft polymer.

2. A method of optimizing the impact strength of an ABS graft polymer, said method comprising:
   correlating rubber crosslink density % A data of diene substrates used to make said ABS graft polymer with a low temperature impact strength data of ABS graft polymers made therefrom; and
   selecting the appropriate crosslink density % A of the diene substrates associated with the desired impact strength for use in a subsequent graft reaction.

3. A process to prepare ABS graft polymers having an improved impact strength, said method comprising:
   preparing a diene rubber latex via a semi-batch process wherein a chain transfer agent is added to said process on a continuous basis for said diene substrate to have an appropriate crosslink density % A to achieve a desired impact strength;
   charging a reaction system with said diene rubber latex;
   adding to the reaction system, over a predetermined time, acrylonitrile and styrene monomers and optionally, an initiator; and
   polymerizing said reaction mixture of polybutadiene, styrene and acrylonitrile.

4. The process of claim 3, further comprising adding a third monomer to the reaction mixture after at least 95% of said styrene and acrylonitrile monomers have reacted.

5. The process of claim 4, further comprising adding a third monomer to the reaction mixture after at least 98% of said styrene and acrylonitrile monomers have reacted.

6. The process of claim 5, further comprising adding a third monomer to the reaction mixture after at least 99% of said styrene and acrylonitrile monomers have reacted.

7. A process to prepare ABS graft polymers having a low end content of unreacted residual monomers, said process comprising:
   charging a reaction system with a diene emulsion;
   adding to the reaction system, over a predetermined time, acrylonitrile and styrene monomers and optionally, an initiator;
   polymerizing the reaction mixture of polybutadiene, styrene and acrylonitrile; and
   adding up to 5% of the total polymer and monomer content of a third monomer, that is highly reactive with both acrylonitrile and styrene monomers, to the reaction mixture after greater than 98% of said styrene and acrylonitrile monomers have reacted.

8. The process of claim 7, further comprising adding at least an initiator along with said third monomer to the reaction mixture.

9. The process of claim 7, wherein the initiator comprises at least one of cumene hydroperoxide, sodium persulfate, potassium persulfate, ammonium persulfate, di-isopropylbenzene hydroperoxide, and tertbutyl-peroxide.

10. The process of claim 7, wherein said third monomer is added to the reaction mixture after at least 99% of said styrene and acrylonitrile monomers have reacted.

11. An emulsion polymerization process for the preparation of diene grafted with styrene and acrylonitrile monomers in a reaction system to form grafted ABS polymers having a low end content of unreacted residual monomers and an improved impact strength, said process comprising:

charging the reaction system with an emulsion comprising a diene substrate having a crosslink density % A which has been selected based on a desired impact strength of an ABS graft polymer product;

adding a first portion of at least one of styrene monomer and acrylonitrile monomer to the diene emulsion;

polymerizing said reaction mixture of diene, styrene and acrylonitrile; and adding a third monomer to the reaction mixture after at least 95% of said styrene and acrylonitrile monomers have reacted.

12. The process of claim 11, wherein said third monomer is added to the reaction mixture after at least 98% of said styrene and acrylonitrile monomers have reacted.

13. The process of claim 12, wherein said third monomer is added to the reaction mixture after at least 99% of said styrene and acrylonitrile monomers have reacted.

14. The process of claim 11, wherein the third monomer is added at an amount of about 0.5 to about 5.0 parts of the third monomer per 100 parts of polymer and monomer.

15. The process of claim 11, wherein the third monomer comprises at least one of methyl acrylate, ethyl acrylate, butyl acrylate, 2-ethylhexyl acrylate, cyclohexyl acrylate, benzyl acrylate, isobornyl acrylate, methyl methacrylate, ethyl methacrylate, butyl methacrylate, isobornyl methacrylate, isodecyl methacrylate, cyclohexyl methacrylate, benzyl methacrylate, acrylamide, methacrylamide, vinylidine chloride, vinylidine bromide, vinyl acetate, vinyl propionate, dimethyl maleate, diethyl maleate, dibutyl maleate, dimethyl fumarate, diethyl fumarate, and dibutyl fumarate.

16. The process of claim 11, wherein the additional monomer comprises methyl methacrylate.

17. The process of claim 11, wherein an additional initiator is added with the third monomer.

18. The process of claim 11, wherein the initiator comprises at least one of cumene hydroperoxide, sodium persulfate, potassium persulfate, ammonium persulfate, di-isopropylbenzene hydroperoxide, and tertbutyl-peroxide.

* * * * *